UNITED STATES PATENT OFFICE.

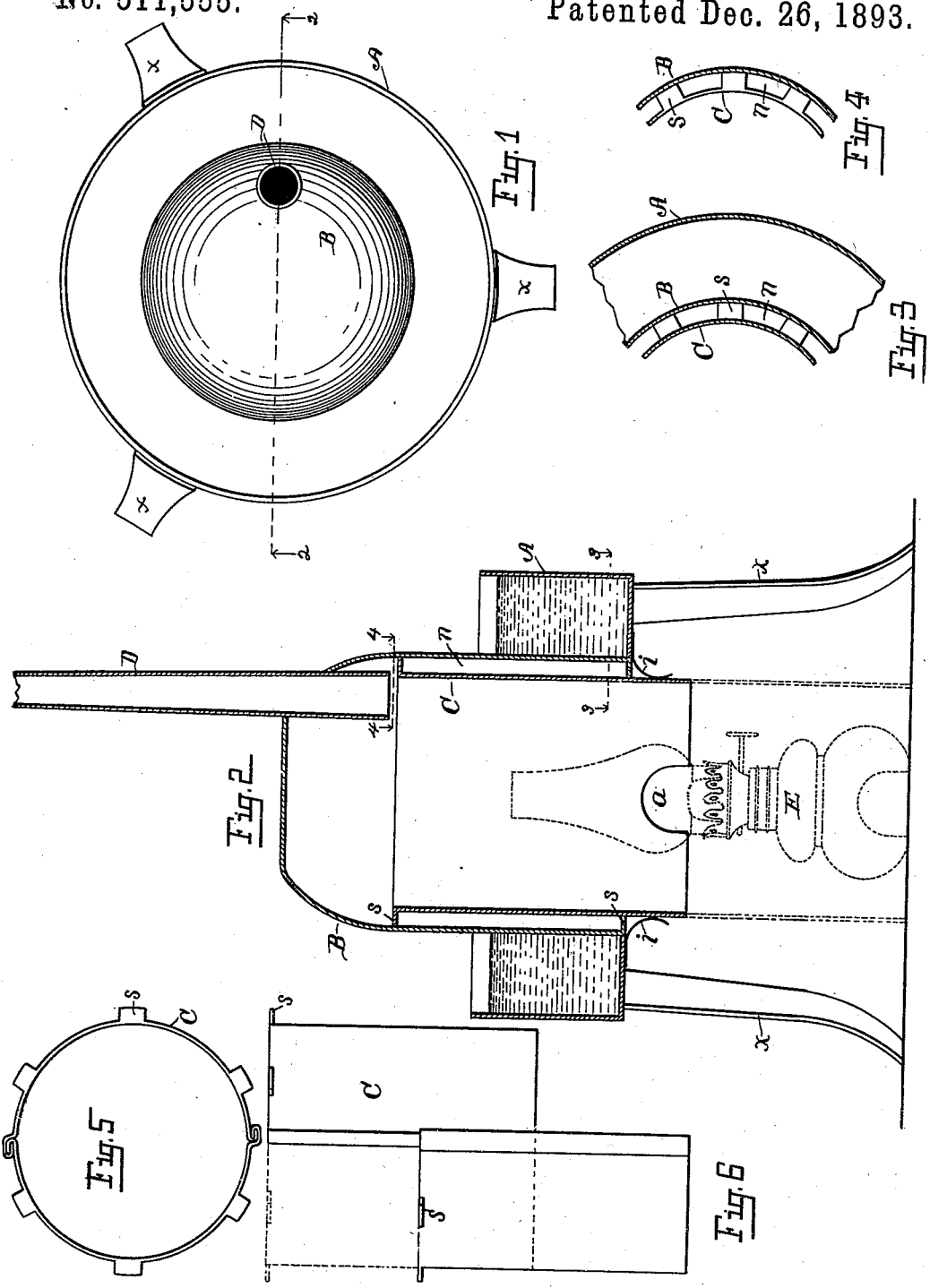

HENRY D. STREATOR, OF GALESBURG, MICHIGAN.

APPARATUS FOR CONTROLLING MOISTURE IN THE AIR.

SPECIFICATION forming part of Letters Patent No. 511,555, dated December 26, 1893.

Application filed April 4, 1893. Serial No. 468,989. (No model.)

*To all whom it may concern:*

Be it known that I, HENRY D. STREATOR, a citizen of the United States, residing at the village of Galesburg, in the county of Kalamazoo and State of Michigan, have invented certain new and useful Apparatus for Controlling Moisture in the Air, of which the following is a specification.

My invention relates to apparatus for controlling moisture in the atmosphere.

The object of my invention is to provide means for controlling and for maintaining the degree of moisture of the atmosphere in a confined space as in a room or hall or in a cabinet where a definite degree of moisture is required—that is, to increase the moisture in the air when desired or dry the air when desired and maintain the degree at a fixed point. I accomplish this result by the apparatus shown in the accompanying drawings, in which—

Figure 1, is a top view of my invention. Fig. 2, is a sectional view on line 2—2 of Fig. 1. Fig. 3, is a sectional view on line 3—3 of Fig. 2 looking down. Fig. 4, is a sectional view on line 4—4 of Fig. 2 looking down. Figs. 5 and 6 show a modification of the cylinder C.

Similar letters of reference refer to similar parts throughout the several views.

An inverted closed hollow cylinder B, is surrounded at the bottom by a tank A, the bottom of the cylinder forming the inner wall of the tank, both of which are supported at a convenient height, by the legs $x$. Through the top of the cylinder B projects the vertical open tube D which opens considerably below the top of the cylinder B.

Inside of the closed cylinder B, is another smaller open cylinder C, which is held in place by the lugs $s$ which in this view project outward from the top of cylinder C, and inward from the bottom of cylinder B so as to leave an air space $n$ at the top and bottom between the inside cylinder C, and the outside cylinder B. The inner cylinder C is adapted to be moved up and down and is held in place by the springs $i$ or other suitable means. A lamp E is placed directly beneath the cylinder C. The tank A being filled with water and the lamp E being lighted the moisture of the air is controlled by moving the cylinder C up and down as indicated by the dotted lines. When the top of the cylinder C comes below the top of the water the heat from the lamp will strike directly against the tank of water and cause the water to evaporate, the amount of evaporation of course depending on the position of the cylinder C. When the air is too moist the thimble is pushed up as shown in the drawings. A current of cold air constantly passes up between the two cylinders and prevents any artificial evaporation of the water in the tank. Because the tube D opens below the top of cylinder B, a quantity of heated air will be held in the top of the cylinder B which will radiate heat and so dry the atmosphere. The heated air from the lamp might pass directly into the room or cabinet and accomplish the object but I prefer it as shown. The tube D is to supply a draft for the lamp E and allow a current up which will keep the space next to the tank cool. The notch $a$ in the bottom of cylinder C is to admit air to the lamp when the cylinder is pushed to the bottom as indicated by the dotted lines.

A little adjustment of my apparatus will cause the atmosphere to maintain a definite degree of moisture. A hygrometer or other indicator should be used to show the degree of moisture in order to use my invention to the best advantage.

I desire to say that the form or proportions here shown are not essential to my invention. Instead of being cylindrical the parts could be in any other form. The inner cylinder could be made in sections movable separately as shown in Figs. 5 and 6 so that a more definite control can be maintained. The size of the tank A is not material and it might be extended indefinitely.

I prefer to have the top of the tube D extend beyond the confined space where the moisture is to be controlled but my apparatus will be effective if the tube opens into the space. A current of heated air generated by other means than the lamp E will be just as effective.

Having thus described my invention, what I claim as new, and desire to secure by Letters Patent, is—

1. In a device for controlling the moisture of the atmosphere, a hollow cylinder closed at the top projecting up through a tank of water in combination with an adjustable interior open hollow cylinder, an open air space between the two cylinders, means for heating the air in the inner cylinder and a tube to allow the heated air to pass up and out substantially as described.

2. The combination of a tank of water, a suitable heater, separated from the tank by an intervening adjustable partition, having an open air space between it and the tank and suitable means for the escape of the heated air to control the degree of moisture or dryness in a confined space, substantially as described.

3. The combination of the tank A, the cylinder B, the adjustable inner cylinder C forming open air space $n$, the tube D opening below the top of cylinder B, and suitable means for heating the interior of cylinder C substantially as described for the purpose specified.

In witness whereof I have hereunto set my hand and seal in the presence of two witnesses.

HENRY D. STREATOR. [L. S.]

Witnesses:
 E. S. ROSS,
 CORA WESTBROOK.